United States Patent [19]

Smith et al.

[11] 4,141,823
[45] Feb. 27, 1979

[54] TREATMENT OF WASTE WATER

[75] Inventors: Kenneth C. Smith, Royden; Michael E. Garrett, Woking, both of England

[73] Assignee: The British Oxygen Company Limited, London, England

[21] Appl. No.: 711,354

[22] Filed: Aug. 3, 1976

[30] Foreign Application Priority Data

Aug. 5, 1975 [GB] United Kingdom ............... 32637/75

[51] Int. Cl.$^2$ ............................................. C02C 1/04
[52] U.S. Cl. ..................................... 210/17; 210/150
[58] Field of Search ................. 210/17, 150, 151, 199

[56] References Cited

U.S. PATENT DOCUMENTS

| 3,335,081 | 8/1967 | El-Naggar | 210/150 |
| 3,540,589 | 11/1970 | Boris | 210/150 |
| 3,617,541 | 11/1971 | Pan | 210/17 |
| 3,933,629 | 1/1976 | Smith | 210/17 |
| 4,045,344 | 8/1977 | Yokota | 210/151 |

Primary Examiner—Thomas G. Wyse
Attorney, Agent, or Firm—Dennison, Dennison, Meserole & Pollack

[57] ABSTRACT

A process for treating aqueous waste material having a biochemical oxygen demand, which process comprises passing the aqueous waste material along an elongate treatment tank or other elongate container for containing a volume of such material, having a transverse support structure or structures extending along the length of the tank or container and supporting aerobic microorganisms, and dissolving an oxygenating gas in aqueous waste material at a plurality of positions spaced along the tank.

23 Claims, 5 Drawing Figures

TREATMENT OF WASTE WATER

FIELD OF THE INVENTION

This invention relates to the treatment of aqueous waste material, having a biochemical oxygen demand (BOD).

BACKGROUND TO THE INVENTION

One method of treating aqueous waste material is to pass it vertically through a biological filter, that is a bed of solid material usually in particulate form, which supports micro-organisms. Normally such a filter is used in municipal sewage treatment plants. In such a plant a primary settling step is performed to remove relatively large suspended solids from the sewage. The supernatant liquid is then passed vertically downwards through the filter bed. The action of the micro-organisms retained in the bed reduces the biochemical oxygen demand (BOD) of the sewage. This type of plant is a widely-used alternative to the activated sludge process, according to which activated sludge is added to the sewage which is then passed to and held in a treatment tank. An oxygen containing gas is then introduced into the sewage to stimulate the bacteria in the sludge thereby promoting break-down of the harmful constituents of sewage.

U.S. Pat. No. 3,933,629 relates to making the optimum use of a biological filter. According to that specification there is provided a process for treating a filter bed in which micro-organisms are supported, wherein the micro-organisms are supplied with oxygen by introducing oxygen-enriched gas into water and passing the oxygenated water through the filter bed. The introduction of the oxygen-enriched gas which is substantially pure oxygen or oxygen-enriched air, helps to maintain aerobic conditions in the filter.

SUMMARY OF THE INVENTION

According to the present invention there is provided a process for treating aqueous waste material having a biochemical oxygen demand, which process comprises passing the aqueous waste material along an elongate treatment tank, or other elongate container for containing a volume of such material, having a transverse support structure or structures extending along the length of the tank or container and supporting aerobic micro-organisms, and dissolving an oxygenating gas (as hereinbefore described) in aqueous waste material at a plurality of positions spaced along the tank.

The invention also provides an apparatus for treating aqueous waste material having a biochemical oxygen demand, which apparatus comprises an elongate treatment tank, or other container for containing a volume of aqueous waste material, having an inlet, and an outlet spaced along the tank or container from the inlet, a transverse support structure or structures suitable for supporting aerobic micro-organisms extending along the length of the interior of the tank and means to introduce oxygenating gas into the interior of the tank between the aforesaid inlet at a plurality of positions spaced along the tank. By the term 'oxygenating gas,' as used herein is meant substantially pure oxygen or a mixture of gases containing more than 21.8% by volume of oxygen.

Preferably the oxygenating gas has an oxygen content of at least 80% by volume and most preferably at least 98%.

Each support structure should desirably offer a large surface area for supporting micro-organisms. It can therefore take the form Raschig rings or other extended surface matrix or paticulate material such as clinker. Such material could be formed as a bed supported in a container whose walls have passages for the horizontal flow of liquid therethrough. It is not necessary, however, for the support structures to be formed as a bed. Indeed, the support structures, can take the form of spaced apart pieces of wire mesh or coiled strand-like material with passages for liquid flow therethrough for example a grid or coils made of plastics material suspended within the tank. Preferably the support structures are removable from the tank for cleaning purposes.

Different micro-organisms may be cultivated on respective support structures, for example, aerobic micro-organisms which oxidize carbonaceous compounds and micro-organisms which oxidize nitrogeneous compounds in the waste material passing through the tank. Micro-organisms which effect the oxidation of nitrogeneous compounds require a greater quantity of oxygen and a longer contact time than do micro-organisms which effect the oxidation of the carbonaceous compounds. In use the micro-organisms which effect oxidation of the carbonaceous compounds will naturally tend to collect on the upstream support structures and the micro-organisms which effect oxidation of the nitrogeneous compounds on the downstream support structures. Therefore in some embodiments of the invention the cross-sectional area of the tank or container may be greater at regions towards the outlet that the area thereof adjacent the inlet, support structures of larger area being provided to support the micro-organisms which effect the oxidation of the nitrogeneous compounds. The sewage in the regions of the tank defined between these latter support structures can therefore be provided with a greater quantity of oxygenating gas which is required by the micro-organisms supported on those structures and furthermore the flow of the oxygenated sewage is reduced to effect a longer contact time with the micro-organisms.

Treatment in a tank in accordance with the invention is both convenient and efficient and may be employed in an established sewage treatment plant. One particular advantage is that the sewage treatment can be operated as a continuous process.

The direction of liquid flow in the tank may be arranged to be rectilinear, circular or spiral, the tank being shaped accordingly.

A space is preferably left between the base of the tank and the support structures so as to facilitate withdrawal from the tank of both non-degradable solids and surplus micro-organisms which become detached from the support structures. In such an arrangement, a scraper device may be provided at the bottom of the tank, the device being movable to move settled sludge towards an outlet from the tank.

The oxygenating gas can conveniently be introduced at the bottom of the tank at the aforesaid plurality of position therein either directly in the form of fine bubbles, or in a pressurized stream of water, for example in accordance with the process of U.S. Patent application Ser. No. 586,390, filed June 12, 1975. The pressurized stream may be withdrawn by a pump from the aqueous material in the tank. Oxygenating gas may be introduced into the stream in a sufficient quantity and under turbulent conditions to provide in the stream dissolved and fine bubbles of undissolved gas which, when the stream is introduced into the aqueous material in the tank or container, are shattered into even finer bubbles which dissolve in, or are consumed within, such material. The rate of introduction of oxygen required to give a desired reduction in the BOD of the water or sewage being treated can be determined empirically.

Some embodiments of the invention will now be described by way of example and with reference to the accompanying drawings, in which.

Figure 1:
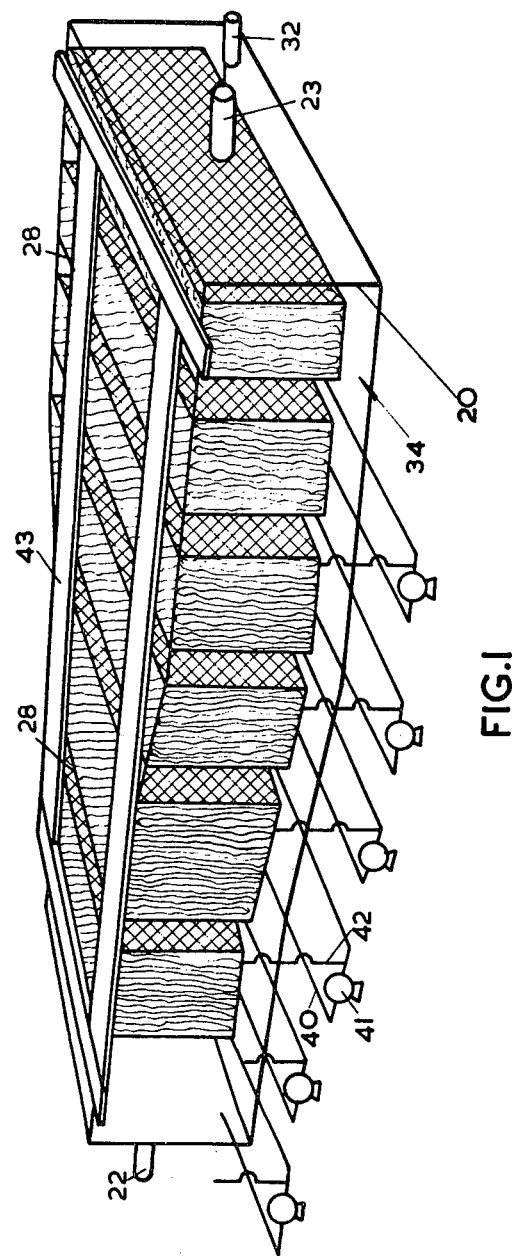
FIG. 1 is a diagrammatic representation of a tank embodying the invention.
Figure 2:
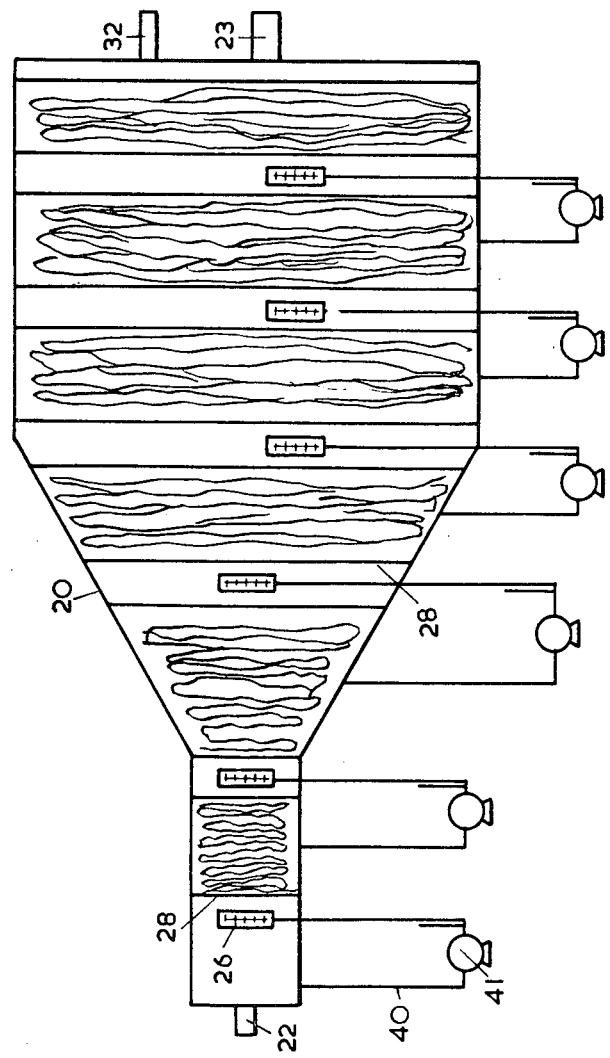
FIG. 2 is a plan view of the tank shown in FIG. 1.

Referring to FIGS. 1 and 2 of the drawings, a rectangular tank 20 has an inlet pipe 22 disposed in an end wall of the tank and an outlet pipe 23 disposed in the opposite end wall. Thus sewage introduced into the tank through pipe 22 flows along the length of the tank to the outlet 23.

A series of six structures 28 on which aerobic micro-organisms can be supported, are disposed in the tank at space locations along its length and extend generally transversely of the tank substantially across the full width thereof. Each structure 28 comprises a box having perforated walls containing a support matrix in the form of extended wire or plastics mesh or coils. The structures are spaced at a small distance from one another in order to facilitate escape of gases stripped from the waste water by introduction of the oxygenating gas, as described below, without unduly disturbing micro-organisms supported on the matrix. In some embodiments it may be satisfactory to use a single elongate matrix. The structures 28 depend from a framework 43, which rests on the top of the tank. A space 34 is left at the bottom of the tank beneath the structures 28 to permit surplus micro-organisms and non-degradable solids to be withdrawn from the tank through a further outlet pipe 32. A scraper device, not shown, movable along the bottom of the tank assists such withdrawal.

Oxygenated water is injected into the tank at locations immediately upstream of each structure 28 through perforated pipes 26. Streams of aqueous waste material are withdrawn from the tank 20 through conduits 40 by pumps 41. Oxygenated gas is introduced into the streams passing through conduit 40 through lines 42 either under pressure or by a venturi effect. Sufficient gas is introduced to provide in the stream dissolved gas as well as an excess amount of gas which is in the form of fine bubbles of undissolved gas entrained in the stream. As the stream enters the aqueous waste material in the tank through the orifices in pipe 26 the fine bubbles of undissolved gas are shattered into even finer bubbles which dissolve in, or are consumed within, the main body of material in the tank 20.

Injection of oxygenated water through the injectors 26 while sewage is flowing from the inlet 22 to the outlet 23 results in a substantial reduction in the biochemical oxygen demand of the sewage.

In a typical example about 500 parts per million (ppm) of oxygenating gas is required to treat the sewage. It is not possible to introduce that amount in a single injection when working at atmospheric pressure where a 50 ppm or less is a typical limit. Therefore a initial injection of 10 to 20 ppm is effected and further injection made at spaced locations downstream as and when the oxygen is stripped by the bacteria supported on the extended matrix. Therefore 50 ppm is dissolved at the first injection point, this is reduced to say 1 or 2 ppm at the second injection point where further oxygenating gas is dissolved to restore the dissolved oxygen concentration to 50 ppm. This is repeated along the length of the tank. Although six introduction points are shown in this example 10 or more points may be required in some practical applications. Dissolved oxygen meters can be provided at the introduction points to control the amount of gas introduced to make up the dissolved oxygen concentration to the required level.

As seen in FIG. 2 the cross section of the tank is larger at the downstream end than at the upstream end since the tank diverges at a position along its length intermediate the end walls of the tank. The structures 28 at the upstream end of the tank support micro-organisms which effect oxidation of the carbonaceous compounds in the sewage whereas micro-organisms which effect oxidation of the nitrogeneous compounds tend to collect on the support structures towards the downstream end of the tank. The region of the tank between the support structures at the downstream end are of greater volume than those regions at the upstream end of the tank so that a greater amount of oxygenating gas can be provided in the sewage at the position immediately upstream of the supports for the micro-organisms which effect oxidation of the nitrogeneous compounds. Moreover the flow velocity in the downstream regions is reduced thereby effecting a larger contact time of oxygenated liquor with the micro-organisms on structures 28.

Figure 3:
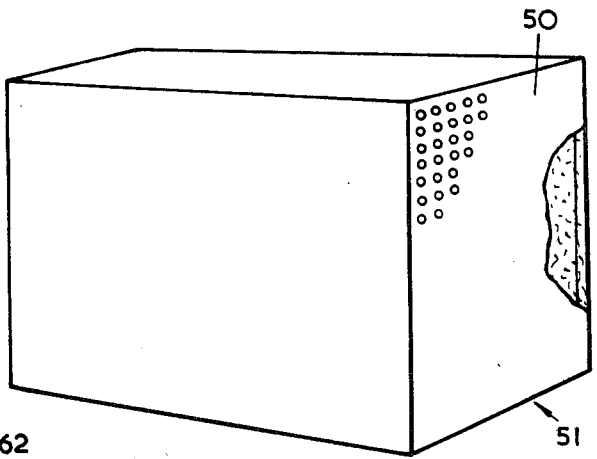
FIG. 3 is a diagrammatic representation of an alternative support structure for a tank as shown in FIG. 1.

Referring to FIG. 3 of the drawings a support structure 50 is shown which can be used in place of the mesh structures 28 shown in FIG. 1. The support structure 50 comprises a rectangular hollow box structure made of sheet metal, the structure being filled with pieces of a solid material for supporting micro-organisms. The walls 51 of the structure 50 are provided with perforations of a size to allow a flow of sewage through the structure while retaining the solid material within the structure 50.

Figure 4:
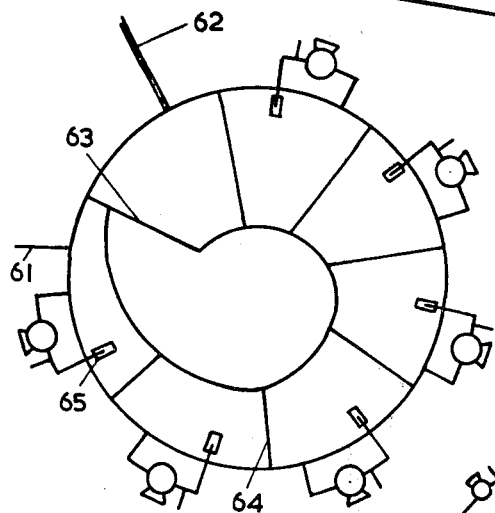
FIG. 4 is a plan view of a second embodiment of a tank according to the invention.
Figure 5:
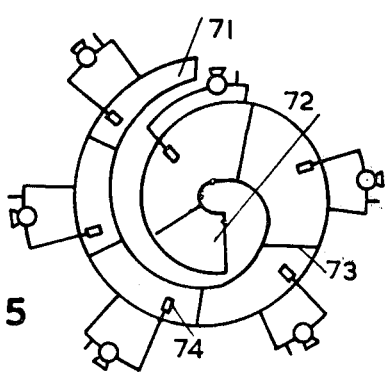
FIG. 5 is a plan view of a third embodiment of the invention.

Referring to FIG. 4 of the drawing there shown a treatment tank according to the invention which is of circular form. The tank 60 is provided with an inlet 61 and an outlet 62 for sewage which is passed through the tank along the elongate arcuate cavity which extends from the inlet to the outlet and increases in area adjacent the outlet end of the cavity. The tank 60 is provided with a solid partition 63 preventing a flow from the inlet 61 directly to outlet 62 without passing around the aforesaid elongate cavity. At spaced intervals along the cavity support structures 64 similar to those described with reference to the earlier embodiment, are located in order to support micro-organisms for breaking down harmful constituents of sewage passed through the tank. Oxygen injectors 65 are provided between the support structures 64 and between the inlet 61 and the first such support structure as described above in relation to the FIG. 1 embodiment. FIG. 5 shows an embodiment of the invention similar to that of FIG. 4 except that the treatment tank 70 is of spiral instead of circular form. An inlet 71, an outlet 72, suupport structures 73 and oxygen injectors 74 in the same manner. The spiral cavity also increases in area adjacent its outlet end where the micro-organisms for oxidizing nitrogenous compounds are supported.

What we claim is:

1. In a process for treating aqueous waste material having a biochemical oxygen demand, which process comprises passing the aqueous waste material along an elongate treatment tank for containing a volume of such material and and biologically digesting the waste material as it passes through the tank, the improvement comprising passing the waste material in generally horizontal through-flow from an inlet to an outlet of the elongate treatment tank, providing at least one stationary transverse bacterial colony support structure positioned along the length of the tank and extending substantially across the tank intermediate the ends thereof and supporting aerobic micro-organisms below the surface of the aqueous waste material, and dissolving an oxygenating gas in the aqueous waste material at a plurality of positions spaced along the tank at least upstream of the at least one support structure to oxygenate the waste material flowing toward the support structure and maintain aerobic conditions in the support structure.

2. A process as claimed in claim 1 wherein a series of spaced support structures are provided and oxygenating gas is dissolved in aqueous waste material in regions of the tank defined between adjacent support structures.

3. A process as claimed in claim 2 wherein a greater quantity of dissolved oxygenating gas is provided in the waste material in at least one region of the tank immediately upstream of a support structure on which micro-organisms for oxidizing nitrogeneous compounds are supported than that provided in the aqueous waste material in at least one region of the tank immediately upstream of support structure on which micro-organisms for oxidizing carbonaceous compounds are supported.

4. A process as claimed in claim 1 wherein the flow velocity of the material is reduced upstream of at least one support structure which supports micro-organisms for oxidizing nitrogeneous compounds to increase the contact time between the oxygenated aqueous waste material and such micro-organisms.

5. A process as claimed in claim 1 wherein the oxygenating gas has an oxygen content of at least 80% by volume.

6. A process as claimed in claim 1 wherein the oxygenating gas has an oxygen content of at least 98% by volume.

7. A process as claimed in claim 1 wherein the oxygenating gas is introduced into an aqueous stream which is pressurized, such stream containing the oxygenating gas then being introduced into aqueous waste material in the tank.

8. A process as claimed in claim 7 wherein said stream is withdrawn from the aqueous waste material in the tank.

9. A process as claimed in claim 8 wherein sufficient oxygenating gas is introduced into the stream under turbulent conditions so as to provide in the stream dissolved gas and fine bubbles of undissolved gas which bubbles on entry into the volume of aqueous waste material in the tank or container are shattered into even finer bubbles which dissolve in, or are consumed within, said volume.

10. A process as claimed in claim 7 wherein sufficient oxygenating gas is introduced into the stream under turbulent conditions so as to provide in the stream dissolved gas and fine bubbles of undissolved gas which bubbles on entry into the volume of aqueous waste material in the tank or container are shattered into even finer bubbles which dissolve in, or are consumed within, said volume.

11. Apparatus for treating aqueous waste material having a biochemical oxygen demand, which apparatus comprises an elongate treatment tank for containing a volume of aqueous waste material to be treated and having an inlet, and an outlet spaced along the tank from the inlet for providing for the generally horizontal flow of liquid therethrough, a generally transverse support structure extending substantially across the tank positioned within the tank generally beneath the surface of aqueous waste material to be treated for supporting aerobic micro-organisms, said support structure being positioned along the length of the interior of the tank intermediate the inlet and outlet to receive horizontal through-flow of aqueous waste, and means for introducing oxygenating gas into the interior of the tank upstream of the support structure whereby the aqueous waste material is oxygenated and aerobic conditions maintained in the support structure.

12. Apparatus as claimed in claim 11 wherein there are provided a series of spaced support structures and means to introduce oxygenating gas into regions of the tank between adjacent support structures.

13. Apparatus as claimed in claim 11 wherein said means to introduce oxygenating gas comprise a conduit through which a stream of liquid can be withdrawn from and then returned to the tank, means to circulate liquid through said conduit, and means to introduce an oxygenating gas into the liquid stream in said conduit.

14. Apparatus as claimed in claim 11 wherein the cross-sectional area of the tank is greater at least at one of said regions as compared to that at least at another of said regions which latter region is encountered first by waste material, in use, flowing through the tank from said inlet to said outlet.

15. Apparatus as claimed in claim 11 wherein said support structure comprises an extended surface provided by elongate elements formed as a mesh, grid, or coil.

16. Apparatus as claimed in claim 15 wherein the elongate elements are contained in a box structure having apertures or interstices in its walls to allow the flow therethrough of an aqueous liquor.

17. Apparatus as claimed in claim 11 wherein said support structure comprises a bed of solid elements supported in a container having passages in its wall to allow flow of aqueous waste material through the support structure.

18. Apparatus as claimed in claim 17 wherein the solid elements are in the form of particulate material.

19. Apparatus as claimed in claim 11 wherein the support structure is spaced above the bottom of the tank to facilitate withdrawal of solid remaining in aqueous waste material treated, in use, by passage through the tank or container.

20. Apparatus as claimed in claim 11 wherein the support structure is removably mounted in the tank.

21. Apparatus as claimed in claim 11 wherein the tank provides an elongate cavity for aqueous waste material which is rectilinear.

22. Apparatus as claimed in claim 11 wherein the tank provides an elongate cavity for aqueous waste material which is arcuate.

23. Apparatus as claimed in claim 11 wherein the tank provides an elongate cavity for aqueous waste material which is of spiral form.

* * * * *